(12) United States Patent
Kondo et al.

(10) Patent No.: US 7,719,931 B2
(45) Date of Patent: May 18, 2010

(54) OPTICAL DISK DEVICE, LOOP GAIN SETTING METHOD, AND LOOP GAIN SETTING PROGRAM

(75) Inventors: Kenji Kondo, Kadoma (JP); Katsuya Watanabe, Nara (JP); Shin-ichi Yamada, Katano (JP); Kenji Fujiune, Hirakata (JP)

(73) Assignee: Panasonic Corporation, Osaka (JP)

( * ) Notice: Subject to any disclaimer, the term of this patent is extended or adjusted under 35 U.S.C. 154(b) by 1296 days.

(21) Appl. No.: 11/103,508

(22) Filed: Apr. 12, 2005

(65) Prior Publication Data

US 2005/0237879 A1    Oct. 27, 2005

(30) Foreign Application Priority Data

Apr. 22, 2004   (JP) .............................. 2004-126592

(51) Int. Cl.
  *G11B 7/00*  (2006.01)
  *G11B 5/55*  (2006.01)
  *G11B 7/125* (2006.01)

(52) U.S. Cl. ................................ 369/44.26; 369/53.28
(58) Field of Classification Search ....................... None
See application file for complete search history.

(56) References Cited

U.S. PATENT DOCUMENTS

| | | | |
|---|---|---|---|
| 5,268,883 A | | 12/1993 | Yamaguchi et al. |
| 6,028,826 A | * | 2/2000 | Yamamoto et al. ....... 369/44.35 |
| 6,044,049 A | | 3/2000 | Fujiune et al. |
| 6,044,051 A | * | 3/2000 | Miyagawa et al. ....... 369/47.19 |
| 6,128,272 A | * | 10/2000 | Horimai et al. .......... 369/44.26 |
| 2002/0105865 A1 | | 8/2002 | Kusumoto et al. |
| 2002/0105896 A1 | | 8/2002 | Kusumoto et al. |

FOREIGN PATENT DOCUMENTS

| | | |
|---|---|---|
| JP | 4-19830 | 1/1992 |
| JP | 10-124900 | 5/1998 |

\* cited by examiner

*Primary Examiner*—Joseph H Feild
*Assistant Examiner*—Parul Gupta
(74) *Attorney, Agent, or Firm*—Wenderoth, Lind & Ponack, L.L.P.

(57) ABSTRACT

An optical disk device is disclosed that includes loop gain adjustment means for finding the first tracking loop gain of a first region, and loop gain estimation means for estimating the second loop gain of a second region on the basis of the loop gain of the first region. Accordingly, it is possible to set the optimal tracking control loop gain for all regions. As a side benefit, good tracking control stability can be ensured regardless of the region, which improves the reliability of reproduction and recording.

9 Claims, 8 Drawing Sheets

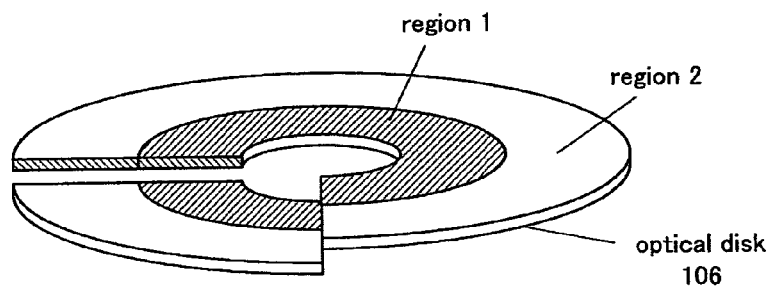
Fig. 2a
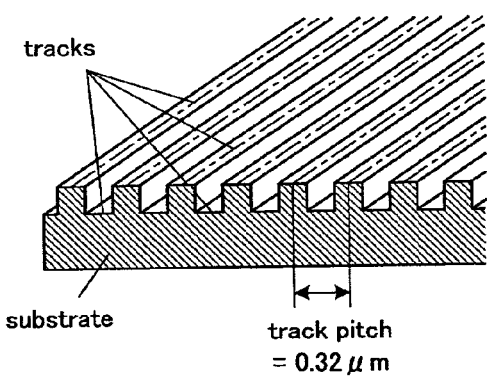 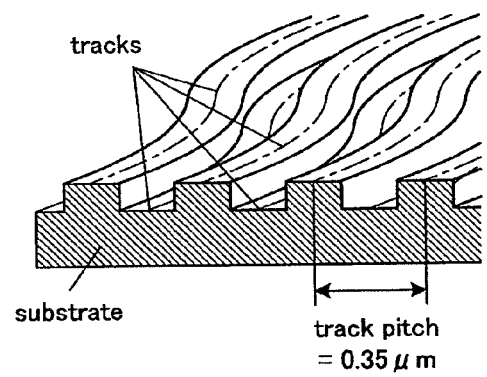
Fig. 2b  Fig. 2c

OPTICAL DISK DEVICE, LOOP GAIN SETTING METHOD, AND LOOP GAIN SETTING PROGRAM

BACKGROUND OF THE INVENTION

1. Field of the Invention

The present invention relates to an optical disk device that uses a laser or other such light source to reproduce signals on an information carrier (including various kinds of information carrier, such as those used only for reproduction and those used for both recording and reproduction), and more particularly to an optical disk device having a tracking control means for controlling a light spot so that it will accurately scan a track. The present invention also relates to a loop gain setting method and a loop gain setting program with which the loop gain of tracking control is set.

2. Background Information

Digital versatile disks (hereinafter referred to as DVDs) have gained prominence in recent years as high-density optical disks that allow a large quantity of digital information to be recorded.

FIG. 5 is a schematic of the structure of a DVD-RAM, which is an example of a high-density optical disk. FIG. 5a is an overall diagram of an optical disk 506. The optical disk 506 is made up of two different doughnut-shaped regions (regions 1 and 2) separated in the radial direction of the disk. Each of these regions has a plurality of tracks. Region 2 has a phase-change film and allows the optical recording or reproduction of information (hereinafter referred to as the RAM region).

FIG. 5b is a cross section of the optical disk 506, cut radially in the RAM region. As shown in FIG. 5b, tracks which are continuous guide grooves are formed at a specific spacing on the substrate surface in the RAM region. These tracks have a pitch of about 1.6 µm. In addition, in this RAM region, convex grooves (hereinafter referred to as groove tracks) and portions sandwiched between these groove tracks (hereinafter referred to as land tracks) are both used as tracks for the recording or reproduction of information.

Meanwhile, in region 1, pits are formed in the tracks by interrupting the grooves. Region 1 is a reproduction-only region in which information is prerecorded by means of these pits (hereinafter referred to as the ROM region).

FIG. 5c is a cross section of the optical disk 506, cut radially in the ROM region. As shown in FIG. 5c, the track pitch is about 0.8 µm in the ROM region.

With a conventional optical disk device, in order to perform stable tracking control of the optical disk 506 during the reproduction or recording of information, the tracking control is performed by switching between tracking error signal detection methods for the RAM region and the ROM region (see, for example, Japanese Laid-Open Patent Application H10-124900 (paragraphs 0022 to 0046, FIGS. 1 to 5)).

A conventional optical disk device will now be described in which tracking control is performed by switching between tracking error signal detection methods in the RAM region and in the ROM region.

FIG. 6 is a block diagram of the configuration of a conventional optical disk device. In FIG. 6, an optical head 100 is made up of a light source 101, a collimator lens 102, a polarizing beam splitter 103, a quarter wavelength plate 104, an objective lens 105, a converging lens 107, a detector 108, and a tracking actuator 123.

The light source 101 is a semiconductor laser device, which outputs an optical beam onto the information side of the optical disk 506. The collimator lens 102 converts the divergent light emitted from the light source 101 into parallel light. The polarizing beam splitter 103 is an optical device that reflects all of the linear polarized light emitted from the light source 101, and transmits all of the linear polarized light perpendicular to the linear polarized light emitted from the light source 101. The quarter wavelength plate 104 is an optical device that converts the transmitted polarized light from circular polarized light to linear polarized light, or from linear polarized light into circular polarized light. The objective lens 105 converges the optical beam onto the information side of the optical disk 506. The converging lens 107 converges the optical beam transmitted by the polarizing beam splitter 103 on the detector 108. The detector 108 is a device that converts the light it receives into an electrical signal, and is split up into four detection regions. The tracking actuator 123 is a member that moves the focal point of the optical beam in the radial direction of the optical disk 506.

FIG. 7 is a plan view of the detector 108. As shown in FIG. 7, the detector 108 has four detection sub-regions A, B, C, and D. The left-right direction in the drawing is the radial direction of the optical disk 506 (hereinafter referred to as the tracking direction), while the vertical direction is the track lengthwise direction.

Preamps 109a to 109d are electrical devices that convert the output current of the four detection sub-regions A to D of the detector 108 into voltage. Adders 110a to 110d are electrical circuits that add two of the outputs of the preamps 109a to 109d and output the result. A subtracter 111 is an electrical circuit that subtracts the two output signals of the adders 110c and 110d and outputs the result. Comparators 112a and 112b are electrical circuits that digitize the outputs of the adders 110a and 110b. A phase comparator 113 compares the digitized signal outputted from the comparators 112a and 112b and outputs pulses with a time width corresponding to the phase advance or phase delay of the edge. A low pass filter 114 is an electrical circuit that smoothes the pulse signals outputted from the phase comparator 113. A switch 115 is an electrical circuit that outputs either the output signal from the low pass filter 114 or the output signal from the subtracter 111 according to a command signal from a microcomputer 119. A tracking controller 116 is a circuit that outputs a tracking control signal on the basis of the output signal from the switch 115. An A/D converter 117 is a circuit that samples the tracking control signal from the tracking controller 116 and converts it into a discrete signal. A disturbance generator 118 is a circuit that outputs a disturbance signal of a specific frequency according to a command from the microcomputer 119. An adder 120 is an electrical circuit that adds the tracking control signal from the tracking controller 116 and the disturbance signal from the disturbance generator 118 and outputs the result. A gain adjuster 121 is an electrical circuit that can set the gain to the desired value on the basis of a command signal from the microcomputer 119. A tracking driver 122 is a circuit that outputs a tracking actuator drive signal on the basis of the signal outputted from the gain adjuster 121. The tracking actuator 123 is an element that moves the objective lens 105 in the radial direction of the optical disk 506. An adder 124 is an electrical circuit that adds the two output signals of the adders 110c and 110d and outputs the result. An address regenerator 125 is a circuit that reads and outputs an address from the total amount of light obtained at the detector 108. A comparator 126 is an electrical circuit that digitizes and outputs the output signal from the switch 115. A pulse counter 127 is a circuit that counts the number of rising edges of the digitized signal outputted from the comparator 126. A memory 128 is a storage circuit for holding data. A transport motor driver 129 is a circuit that amplifies and outputs a transport motor drive signal outputted from the microcomputer 119. A transport motor 130 is an element that moves the optical head 100 in the radial direction of the optical disk 506.

The operation of a conventional optical disk device configured as above will be described through reference to FIG. 6.

The optical beam of linear polarized light emitted from the light source 101 is incident on the collimator lens 102 and converted into parallel light by the collimator lens 102. The optical beam that has been made into parallel light by the collimator lens 102 is incident on the polarizing beam splitter 103. The optical beam reflected by the polarizing beam splitter 103 is converted into circular polarized light by the quarter wavelength plate 104. The optical beam converted into circular polarized light by the quarter wavelength plate 104 is incident on the objective lens 105, and is focused on the optical disk 506. The optical beam reflected by the optical disk 506 is transmitted through the polarizing beam splitter 103 and is incident on the converging lens 107. The optical beam that was incident on the converging lens 107 is then incident on the four sub-regions A to D of the detector 108. The optical beam incident on the four sub-regions A to D of the detector 108 is converted into electrical signals for each region. The electrical signals converted for each region of the detector 108 are converted into voltage by the preamps 109a to 109d.

The tracking control operation in the RAM region will now be described.

The output signals from the preamps 109a and 109b are added by the adder 110c. The output signals from the preamps 109c and 109d are added by the adder 110d. The output signals from the adders 110c and 110d are subtracted by the subtracter 111, which gives a tracking error signal (hereinafter referred to as TE signal) indicating the positional relation between a track and the light spot on the optical disk 506.

The above method for detecting TE signals is generally called a push-pull method. If the optical beam deviates from the group track center, or from the land track center, the intensity distribution to the left and right of primary diffracted light diffracted at the edge of the track changes according to this offset. With a push-pull method, track offset is detected by utilizing this change in the intensity distribution. A TE signal obtained by push-pull method is called a push-pull TE signal (hereinafter referred to as a PPTE signal).

The PPTE signal that is the output signal from the subtracter 111 is inputted through the switch 115 to the tracking controller 116, is transmitted through a low frequency compensation circuit, a phase compensation circuit, or other such circuit made up of a digital filter involving a digital signal processor (hereinafter referred to as a DSP), and becomes a tracking drive signal. The tracking drive signal outputted from the tracking controller 116 goes through the adder 120 and amplified to a specific gain in the gain adjuster 121. The output signal from the gain adjuster 121 is inputted to and amplified by the tracking driver 122, and outputted to the tracking actuator 123.

The position of the objective lens 105 is controlled in the radial direction of the optical disk 506 by the above tracking control operation so that the optical beam focused on the optical disk 506 scans the desired track of the RAM region of the optical disk 506.

Next, the tracking control operation in the ROM region will be described.

The output signals from the preamps 109a and 109c are added by the adder 110a. The output signals from the preamps 109b and 109d are added by the adder 110b. The output signals from the adders 110a and 110b are converted into digitized signals by the comparators 112a and 112b, respectively. The digitized signals from the comparators 112a and 112b are compared for phase by the phase comparator 113, and pulses with a time width corresponding to the phase advance or phase delay of the edge are outputted. The pulse signals outputted from the phase comparator 113 are smoothed by the low pass filter 114 and become TE signals.

The above method for detecting TE signals is generally called a phase difference method. When the optical beam passes pits, the intensity distribution of the reflected light on the detector 108 varies with the position of the optical beam in the tracking direction, which produces a deviation in the phase of each of the diagonal sum signals of the four sub-regions. The phase difference method involves detecting track offset by utilizing this deviation in phase. A TE signal obtained by phase difference method will hereinafter be referred to as a phase difference TE signal.

The phase difference TE signal that is the output signal from the low pass filter 114 is inputted through the switch 115 to the tracking controller 116. The processing after this is the same as that in the tracking operation performed in the RAM region.

The position of the objective lens 105 is controlled in the radial direction of the optical disk 506 by the above tracking control operation so that the optical beam focused on the optical disk 506 scans the desired track of the ROM region of the optical disk 506.

The "search operation" will also be described through reference to FIG. 6. This search operation is an operation in which the optical beam is moved from a state of being located on a track in the RAM region to a state of being located on the desired track in the ROM region, or, conversely, an operation in which the optical beam is moved from the ROM region to the RAM region.

Before describing this "search operation," the "address regeneration operation" will be described first. Address regeneration is an operation in which the current address of the light spot is obtained.

The output signals from the adders 110c and 110d are added by the adder 124, producing a signal corresponding to the total amount of light obtained at the detector 108. The output signal from the adder 124 (the total amount of light) is inputted to the address regenerator 125. The address regenerator 125 digitizes the input signal so as to read the address, and the read address is outputted to the microcomputer 119. The above address regeneration operation allows the optical disk device to obtain the current address of the light spot.

Next, the search operation from the RAM region to the ROM region will be described.

A boundary address ADb between the ROM region and the RAM region is stored in a memory 128. When the address ADt of the desired track is inputted to the microcomputer 119, the microcomputer 119 obtains the current address AD0 from the address regenerator 125 and calculates the number of tracks Nt (=AD0−ADt) between the current track and the desired track. The microcomputer 119 also compares the boundary address ADb with the desired track address ADt to find whether the desired track is in the ROM region, and calculates the number of tracks Nb (=AD0−ADb) until the ROM region is entered. The microcomputer 119 also produces a transport motor drive signal on the basis of the calculated number of tracks Nt, and outputs this signal to the transport motor driver 129. The transport motor driver 129 amplifies the transport motor drive signal and outputs it to the transport motor 130.

A PPTE signal is generated when the optical head 100 is moved by the transport motor 130 in the radial direction of the optical disk 506. This PPTE signal is inputted through the switch 115 to the comparator 126, where it is digitized. The pulse counter 127 counts the number of rising edges of the digitized signal from the comparator 126, so that the number of tracks Nc crossed by the optical beam since the start of the search operation is outputted to the microcomputer 119. The microcomputer 119 reads the number of tracks Nc crossed by the optical beam since the start of the search operation, and compares this number to see if Nc is greater or less than the number of tracks Nb until the ROM region is entered. If Nc is less than Nb, the microcomputer 119 leaves the output signal from the switch 115 as a PPTE signal. If Nc is greater than or equal to Nb, the microcomputer 119 switches the output signal from the switch 115 from a PPTE signal to a phase difference TE signal. Further, when the microcomputer 119 reads the number of tracks Nc crossed by the optical beam since the start of the search operation, if Nc is equal to Nt, the count of the pulse counter 127 is reset and tracking control is performed. The tracking control operation here is performed on the basis of the phase difference TE signal. After this, the microcomputer 119 obtains the current address from the address regenerator 125, and if the obtained address matches the desired address, the track search operation is concluded, but if there is no match, the above track search operation is repeated until the desired track is found.

The search operation from the ROM region to the RAM region is the same. Specifically, the microcomputer 119 compares the number of tracks Nb (=ADb−AD0) until the RAM region is entered to see if it is greater or less than the number of tracks Nc crossed by the optical beam since the start of the search operation. If Nc is less than Nb, the microcomputer 119 leaves the output signal from the switch 115 as a phase difference TE signal. If Nc is greater than or equal to Nb, the microcomputer 119 switches the output signal from the switch 115 from a phase difference TE signal to a PPTE signal. After this, if Nc and Nt are equal, the microcomputer 119 resets the count of the pulse counter 127, and performs tracking control. The tracking control operation here is performed on the basis of the PPTE signal.

As discussed above, with a conventional optical disk device, if the light spot is moved over the RAM region, a TE signal is produced by a PPTE signal detection method, and if the light spot is moving over the ROM region, a TE signal is produced by a phase difference TE signal detection method.

Further, this optical disk device is configured such that tracking control is performed by suitably switching the TE signal detection method according to the movement between the RAM region and the ROM region.

Another type of optical disk device is one that automatically adjusts the loop gain of tracking control in each region in order to ensure the control characteristics needed for the tracking control system (see, for example, Japanese Laid-Open Patent Application H4-19830 (pages 2 to 5, FIGS. 1 to 7)).

The adjustment of the loop gain in a tracking control system will now be described through reference to FIG. 6.

The microcomputer 119 generates a disturbance signal of a specific frequency by means of the built-in disturbance generator 118. This disturbance signal is applied to the tracking control system by the adder 120. Along with the generation and application of the disturbance signal, the microcomputer 119 also samples and takes in the response signal of the tracking control system with respect to this disturbance signal by means of the A/D converter 117. Further, the microcomputer 119 calculates the disturbance signal applied to the tracking control system and the response signal that is taken in, and measures the ratio between the applied disturbance signal and the incorporated response signal (hereinafter referred to as the loop gain), or the phase difference between the applied disturbance signal and the incorporated response signal (hereinafter referred to as the phase difference). After this, the microcomputer 119 actuates the gain adjuster 121 according to the measured loop gain or phase difference, so that the tracking control system is adjusted to a specific loop gain.

This loop gain adjustment operation results in the optimal loop gain for the tracking control system, allowing stable tracking control to be achieved.

As discussed above, this conventional optical disk device is configured such that loop gain adjustment results in the optimal loop gain for the tracking control system, allowing stable tracking control to be achieved. However, when the RAM region, which is composed of land and groove tracks, and the ROM region, which is composed of pit strings, are mixed together in a disk, as is the case with the optical disk 506, it is necessary to switch between two different detection methods for tracking control, which leads to a larger dedicated circuit in the optical disk device.

Furthermore, the loop gain adjustment has to be performed for the RAM region and for the ROM region in order to achieve stable tracking control in each region, so adjustment takes longer, which leads to lower performance of the optical disk device.

With the next-generation high-density optical disks that allow both recording and reproduction, the recording of information ahead of time in the ROM region is accomplished not by pit strings, but by minutely varying (wobbling) the track shape in the radial direction of the optical disk. In addition, the RAM region is formed by continuous, convex and concave guide grooves, just as with conventional configurations.

Employing the above configuration for these next-generation high-density optical disks allows the same TE signal detection method, namely, PPTE detection, to be used in both the ROM region and the RAM region.

When the recording of information in the ROM region of an optical disk is accomplished by the above-mentioned wobbling, the track pitch must be wider in the ROM region than in the RAM region in order to wobble the track. In other words, the optical disk has a structure in which the track pitch is different in the RAM region and the ROM region.

The following problems are encountered when a PPTE signal detection method is applied to an optical disk such as this that has a plurality of regions of different track pitch.

FIG. 8 is a diagram of the correspondence between the PPTE signal waveform and the tracks on an optical disk 106 having regions of different track pitch. FIG. 8a is a cross section of the optical disk 106 in its radial direction. As shown in the drawing, region 1 is a region with a track pitch of Tp1, while region 2 is a region of Tp2. FIG. 8b is a waveform diagram obtained by plotting the PPTE signal obtained at various locations along the horizontal axis in FIG. 8a.

As shown in FIG. 8, the amplitude of the TE signal obtained by PPTE signal detection is dependent on the track pitch where the light spot is located. Accordingly, the detection sensitivity for the TE signal is different in regions 1 and 2, which have different track pitches. Specifically, even if the tracking control loop gain in region 1 is optimally adjusted by loop gain adjustment, the loop gain will still not be optimal in region 2. Therefore, a problem is that stable tracking control cannot be ensured in region 2 even when using an adjusted loop gain in region 1.

It is also possible to perform the adjustment of tracking control loop gain for each region in order to avoid this problem. In this case, the stability of tracking control can be ensured for all regions, but loop gain adjustment has to be carried out once for every region. Consequently, just as with a conventional optical disk device, this leads to longer adjustment time and lower performance of the optical disk device.

The present invention was conceived in an effort to solve the above problems, and provides an optical disk device that includes tracking control means for estimating the loop gain so that the desired tracking control characteristics will be obtained in all of the regions of an optical disk having a plurality of regions of different track pitch.

SUMMARY OF THE INVENTION

The present invention provides an optical disk device for recording information in first and second regions of an information carrier having two or more regions of different track pitch, or for reproducing information that has been recorded, said optical disk device comprising focusing means, movement means, light receiving means, track offset detection means, tracking control means, loop gain adjustment means, and loop gain estimation means. The focusing means focuses the optical beam and directs it at the information carrier. The movement means moves the focal point of the optical beam focused by the focusing means in the radial direction of the information carrier. The light receiving means receives the optical beam reflected by the information side of the information carrier. The track offset detection means detects offset between the track and the focal point of the optical beam on the basis of a signal from the light receiving means. The tracking control means drives the movement means on the basis of a signal from the track offset detection means, and controls the focal point of the optical beam so as to scan the track. The loop gain adjustment means adjusts a first loop gain used in tracking control of the first region, which is the loop gain of the tracking control means. The loop gain estimation means estimates a second loop gain used in tracking control of the second region on the basis of the first loop gain of the first region determined by the loop gain adjustment means.

The "radial direction of the information carrier" is the direction perpendicular to the track, for example. The light receiving means is, for example, a means for receiving return light of the optical beam reflected on the information side, in a plurality of sub-regions. "Tracking control" means controlling the focal point of the optical beam so that it accurately scans the track. The loop gain estimation means estimates the second loop gain before the focal point of the optical beam moves from the first region to the second region.

With the optical disk device of the present invention it is possible to set the optimal tracking control loop gain in both region 1 and region 2. Also, because stability of the tracking control is ensured in both region 1 and region 2, in which the track pitch is different, reliability of reproduction and recording is improved.

With the optical disk device of the present invention, the loop gain estimation means estimates the second loop gain of the second region on the basis of the first loop gain of the first region and the ratio between the amplitude of the signal from the track offset detection means in the first region and the amplitude of the signal from the track offset detection means in the second region.

With the optical disk device of the present invention, because there is no need to perform loop gain adjustment in the second region, adjustment takes less time during device start-up, which improves the performance of the device.

With the optical disk device of the present invention, the loop gain estimation means has storage means for storing the ratio between the track pitch in the first region and the track pitch in the second region as a predetermined value, and estimates the second loop gain of the second region on the basis of the first loop gain of the first region and the predetermined value stored in the storage means.

Because the loop gain does not have to be adjusted for each region with the optical disk device of the present invention, adjustment takes less time during device start-up, which improves the performance of the device.

The optical disk device of the present invention further comprises region determination means for determining whether the focal point of the optical beam is located in the first region or the second region, wherein the loop gain of the tracking control means is switched according to the determination result of the region determination means.

With the optical disk device of the present invention, optimal tracking control is possible in both regions, which improves the reliability of reproduction and recording.

With the optical disk device of the present invention, the region determination means determines the region in which the focal point of the optical beam is located from the change in amplitude of the signal detected by the track offset detection means.

The optical disk device of the present invention makes it possible to switch the tracking control loop gain according to the current location of the focal point of the optical beam, affording optimal tracking control regardless of the region and improving the reliability of reproduction and recording.

The optical disk device of the present invention further comprises track search means for moving the focal point of the optical beam to a desired track, wherein the region determination means determines the region in which the focal point of the optical beam is located when the focal point of the optical beam is moved across the track by the track search means.

With the optical disk device of the present invention, when there is movement between regions due to a track search operation, it is possible to set the optimal tracking control loop gain regardless of the region. Accordingly, it is possible to ensure good tracking control performance after a track search operation straddling a region, which improves the reliability of reproduction and recording.

With the optical disk device of the present invention, the first region on the information carrier is a region in which predetermined information has been recorded using a change in the shape of the track, and the predetermined information is reproduced before the focal point of the optical beam moves to the second region.

With the optical disk device of the present invention, the loop gain does not have to be adjusted in the second region, which means that adjustment takes less time during the start-up of the device, and this improves the performance of the device.

With the optical disk device of the present invention, the second region on the information carrier is a region in which the recording or reproduction of information is performed.

With the optical disk device of the present invention, a recording or reproduction operation can be commenced without first adjusting the loop gain in the second region. This improves the performance of the device.

The loop gain setting method of the present invention is a method for setting the loop gain used in the tracking control of regions in an optical disk device that records information to first and second regions of an information carrier having two or more regions, or reproduces recorded information, comprising a loop gain adjustment step and a loop gain estimation step. In the loop gain adjustment step, a first loop gain used in tracking control of the first region is adjusted. In the loop gain estimation step, a second loop gain used in tracking control of the second region is estimated on the basis of the first loop gain of the first region determined in the loop gain adjustment step.

The loop gain setting method of the present invention makes it possible to set the optimal tracking control loop gain in both region 1 and region 2. A side benefit is that this ensures stability of tracking control in both region 1 and region 2, which have different track pitches, and this improves the reliability of reproduction and recording.

The loop gain setting program of the present invention is a program for executing on a computer a loop gain setting method for setting the loop gain used in the tracking control of regions in an optical disk device that records information to first and second regions of an information carrier having two or more regions, or reproduces recorded information. The loop gain setting method comprises a loop gain adjustment step and a loop gain estimation step. In the loop gain adjustment step, a first loop gain used in tracking control of the first region is adjusted. In the loop gain estimation step, a second loop gain used in tracking control of the second region is estimated on the basis of the first loop gain of the first region determined in the loop gain adjustment step.

The loop gain setting program of the present invention makes it possible to set the optimal tracking control loop gain in both region 1 and region 2. A side benefit is that this ensures stability of tracking control in both region 1 and region 2, which have different track pitches, and this improves the reliability of reproduction and recording.

Using the tracking control means of the present optical disk device increases tracking control stability and improves reliability in the reproduction and recording operations of the optical disk device.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2 is a schematic of the structure of an optical disk having regions of different track pitch;

DETAILED DESCRIPTION

Embodiments of the present invention will now be described through reference to the drawings.

Embodiment 1

Configuration

Figure 1:
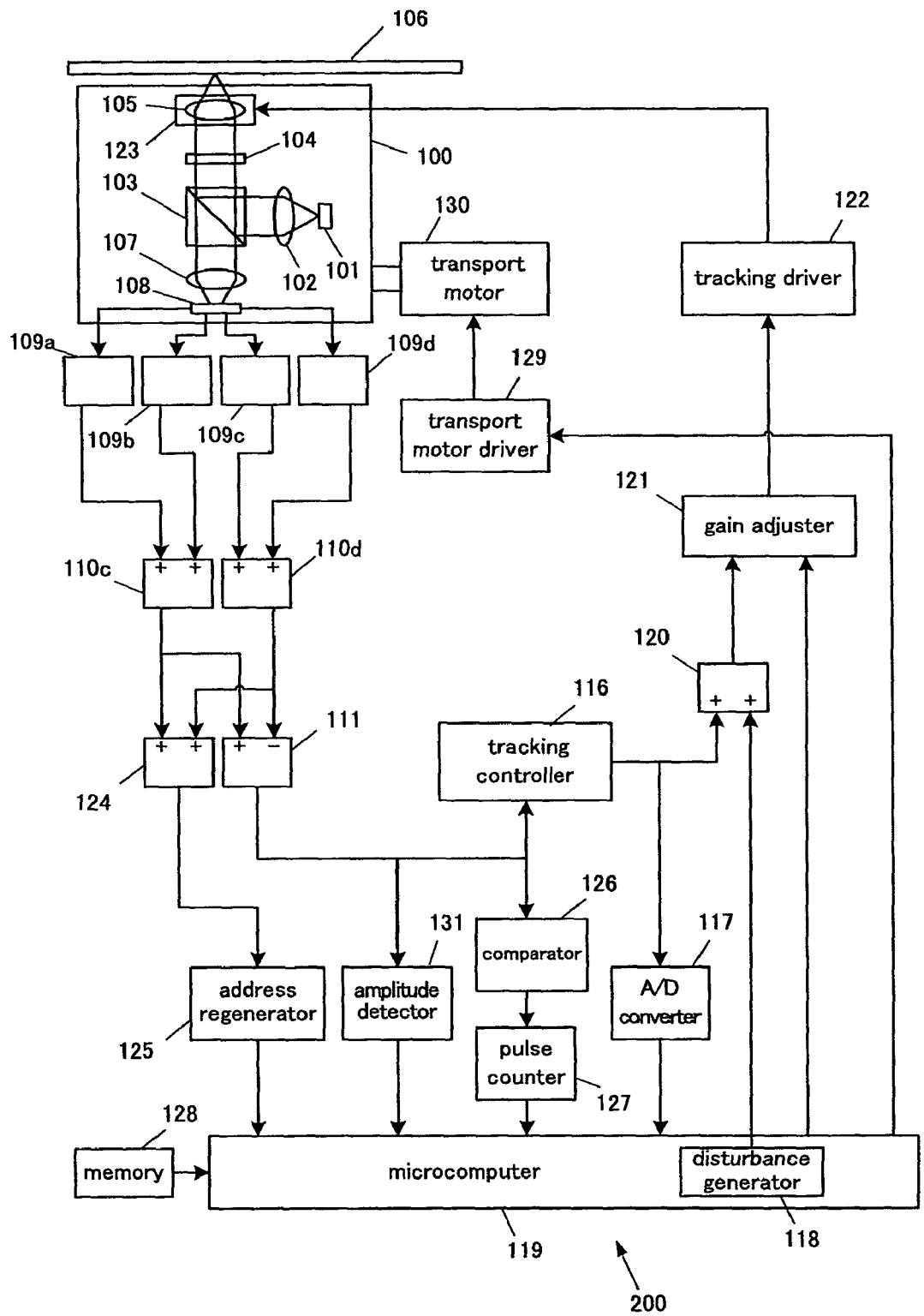
FIG. 1 is a block diagram of an optical disk device according to one embodiment of the present invention.

FIG. 1 is a block diagram of the configuration of an optical disk device 200 in Embodiment 1. Those components that are the same as in a conventional optical disk device are numbered the same, and will not be described again. In FIG. 1, the optical disk 106 has a plurality of regions of different track pitch.

FIG. 2 is a schematic of the structure of the optical disk 106. FIG. 2a is an overall view of the optical disk 106.

The optical disk 106 is made up of two different doughnut-shaped regions (regions 1 and 2) separated in the radial direction of the disk. Each of these regions has a plurality of tracks. The track pitch (Tp1) of region 1 here is 0.35 μm, while the track pitch (Tp2) of region 2 is 0.32 μm.

Region 1 is a region in which information has been pre-recorded by wobbling the shape of the tracks. The recorded information is information that is necessary in the reproduction and recording of an installed optical disk, and can be the capacity of the optical disk, the number of information sides, or the laser emission pattern recommended for recording, for example.

Meanwhile, region 2 is a region having a recording material film and in which information can be optically recorded or reproduced. In FIG. 1, an amplitude detector 131 is a circuit for detecting the signal amplitude of a PPTE signal.

As shown in FIG. 1, the optical disk device comprises focusing means (optical head 100), movement means (tracking actuator 123), light receiving means (detector 108), track offset detection means, tracking control means, loop gain adjustment means, loop gain estimation means, region determination means, and search means.

The "track offset detection means" comprises the preamps 109c and 109d, the adders 110c and 110d, and the subtracter 111.

The "tracking control means" mainly comprises the tracking controller 116, the adder 120, the gain adjuster 121, and the tracking driver 122.

The "loop gain adjustment means" comprises the A/D converter 117, the microcomputer 119, the disturbance generator 118, the adder 120, and the gain adjuster 121.

The "loop gain estimation means" comprises the amplitude detector 131, the microcomputer 119, and storage means (memory 128).

The "region determination means" comprises the amplitude detector 131 and the microcomputer 119.

The "search means" comprises the address regenerator 125, the comparator 126, the pulse counter 127, the microcomputer 119, the transport motor driver 129, and the transport motor 130.

Loop Gain Estimation

The loop gain estimation operation of the optical disk device 200 configured as above will now be described.

Figure 3A:
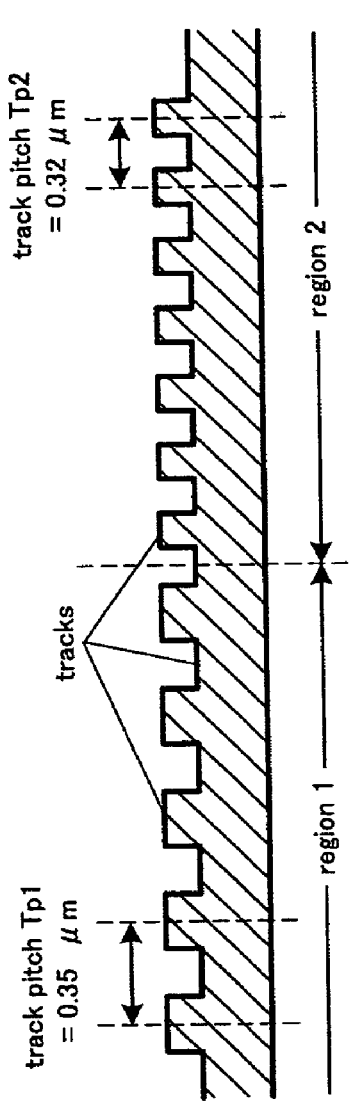
FIG. 3 is a waveform diagram of the correspondence between the PPTE signal amplitude level, the PPTE signal waveform, and the tracks on an optical disk having regions of different track pitch.
Figure 3B:
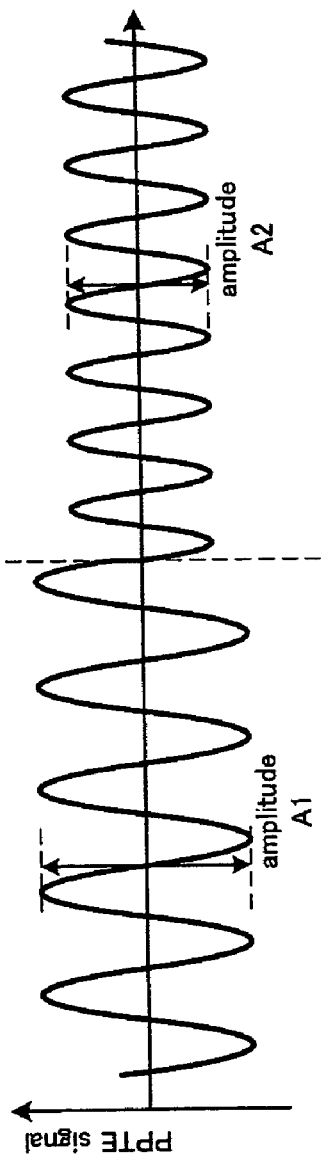
Figures 8A, 8B:
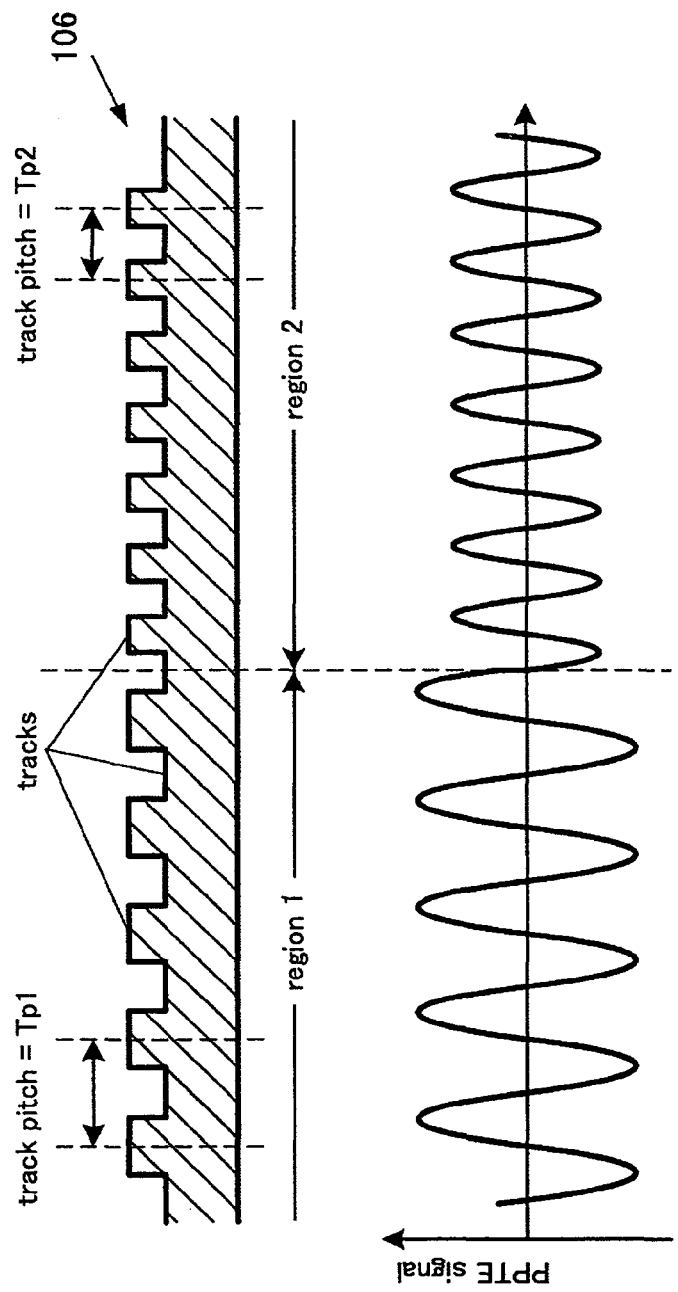
FIG. 8 is a waveform diagram of the correspondence between the PPTE signal waveform and the tracks on an optical disk 106 having regions of different track pitch in a prior art optical disk device.

FIG. 3 is a diagram of the correspondence between the PPTE signal waveform and the tracks on an optical disk 106 having regions 1 and 2 of different track pitch. FIGS. 3a and 3b are the same as FIGS. 8a and 8b, and will therefore not be described again.

Figure 3C:
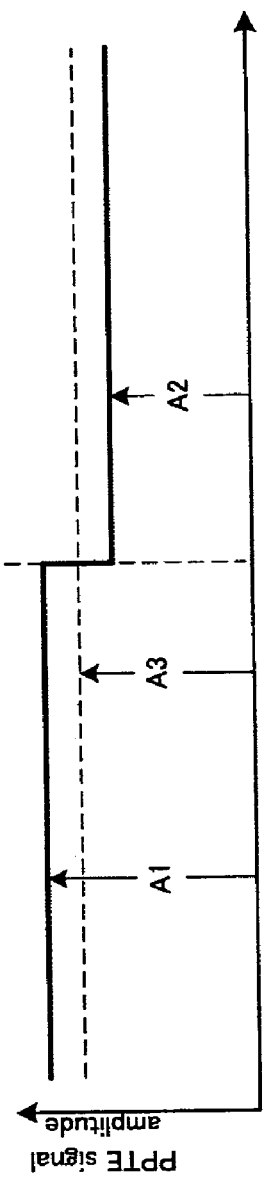

FIG. 3c is a waveform diagram showing the result when the amplitude of the PPTE signal of FIG. 3b was detected with the amplitude detector 131. As shown in FIGS. 3a to 3c, the amplitudes of PPTE signals obtained by the amplitude detector 131 in region 1 and region 2 are termed A1 and A2, respectively.

Since the tracking control loop gain is proportional to the PPTE signal amplitude, if G1 and G2 are the tracking control loop gain in region 1 and region 2, the relation of the following Formula 1 exists between G1 and G2 and A1 and A2.

$$G1/G2 = A1/A2 \quad \text{(Formula 1)}$$

It is assumed here that the gain of the gain adjuster 121 is set so that the loop gain adjustment will produce the optimal loop gain in region 1, and this gain setting be K1. In order to suitably set the tracking control loop gain in region 2 here, the gain K2 at the gain adjuster 121 may be found from the following Formula 2, while taking into account Formula 1.

$$K2 = K1 \times A1/A2 \quad \text{(Formula 2)}$$

The operation for finding the value of the gain K2 from this formula will now be described.

The microcomputer 119 finds the amplitudes A1 and A2 of the PPTE signals in the two regions obtained by the amplitude detector 131, by using peak detection, envelope detection, or another such method. The microcomputer 119 also uses the amplitude values and the gain setting K1, which is the result of loop gain adjustment in region 1, to solve Formula 2 and find the gain setting K2 in region 2.

The above configuration makes it possible to estimate the optimal loop gain in region 2 on the basis of the ratio A1/A2 of the PPTE signal amplitudes in regions 1 and 2, and the loop gain adjustment result K1 in region 1. Specifically, the optimal loop gain can be set in both region 1 and region 2.

With this embodiment, the PPTE signal amplitude in each region is detected, and the ratio of the two amplitudes is used to estimate the loop gain. However, since the PPTE signal amplitude is proportional to the track pitch, this estimation can also be performed using track pitch. Specifically, the ratio Tp1/Tp2 of the track pitches Tp1 and Tp2 is stored ahead of time in the memory 128, and the microcomputer 119 estimates the loop gain in region 2 by using the loop gain adjustment result for region 1 and the track pitch ratio stored in the memory 128. The effect is the same with this method. That is, the loop gain in region 2 can be estimated without using the amplitude detection result produced by the amplitude detector 131.

If the loop gain is adjusted in region 1, this loop gain estimation method does not require that the same adjustment be performed in another region. Specifically, the optimal loop gain can be estimated for each region merely by adjusting the loop gain in region 1 and measuring the PPTE signal amplitudes. Accordingly, the loop gain estimation method of the present invention leads to a reduction in loop gain adjustment time in the regions, which helps improve the performance of the optical disk device.

Switching of Loop Gain

Next, the operation of the optical disk device 200 in this embodiment will be described for a case in which the loop gain is switched between region 1 and region 2. This embodiment is characterized in that region determination is performed by using the PPTE signal amplitudes during the search operation, and the loop gain is switched for each region.

The following description is through reference to FIGS. 1 and 3.

Just as with a conventional optical disk device, when the address ADt of the desired track is inputted to the microcomputer 119, the microcomputer 119 obtains the current address AD0 from the address regenerator 125 and calculates the number of tracks Nt (=AD0−ADt) between the current track and the desired track. The microcomputer 119 also resets the count of the pulse counter 127 and disables tracking control. Further, the microcomputer 119 produces a transport motor drive signal on the basis of the number of tracks Nt, and outputs the transport motor drive signal thus produced to the transport motor driver 129. The transport motor 130 is driven according to the transport motor drive signal, and when the optical head 100 moves in the radial direction of the optical disk 506, a PPTE signal is generated.

As shown in FIGS. 3a to 3c, the PPTE signals obtained from regions of different track pitch have different amplitudes. Therefore, as shown in FIG. 3c, the region in which the light spot is located can be determined by examining the change in amplitude of the PPTE signal detected by the amplitude detector 131 during the search operation.

More specifically, the amplitude A0 of the PPTE signal obtained from the amplitude detector 131 during the search operation is compared to see if it is greater or less than a specific level A3. If A0 is greater than A3 (such as when A0 is A1), the microcomputer 119 determines that the light spot is in region 1. The microcomputer 119 therefore sets the gain setting of the gain adjuster 121 to K1, which is the loop gain adjustment result for region 1. If A0 is less than A3 (such as when A0 is A2), the microcomputer 119 determines that the light spot is in region 2. The microcomputer 119 therefore sets the gain setting of the gain adjuster 121 to K2, which is the estimation result produced by the above loop gain estimation operation.

The microcomputer 119 also reads the number of tracks Nc cross by the optical beam since the start of the search operation, and if Nc is equal to Nt, the microcomputer 119 resets the count of the pulse counter 127 and enables tracking control. After this, the microcomputer 119 obtains the current address from the address regenerator 125, and if the obtained address matches the desired address, the track search operation is concluded, but if there is no match, the above track search operation is repeated until the desired track is found.

Employing the above configuration makes it possible to determine whether the current light spot is located in region 1 or region 2 by using the PPTE signal amplitude during the track search operation, and to switch the gain setting of the gain adjuster 121 between K1 (the setting of region 1) and K2 (the setting of region 2) according to the above determination result.

Therefore, even when there is movement between regions of different track pitch due to the track search operation, the optimal tracking control loop gain can be set in both regions. Accordingly, it is possible to ensure good tracking control performance (track following performance) after a track search operation straddling a region, which improves the performance of the optical disk device.

As discussed above, with an optical disk having a plurality of regions of different track pitch, the PPTE signal amplitude in each region varies with the track pitch. Accordingly, with prior art, the tracking control loop gain could not be optimized for all regions unless the loop gain was adjusted for every region.

With the optical disk device 200 in this embodiment, however, it is possible to estimate the optimal loop gain for each region by using the loop gain adjustment result for one region and the PPTE signal amplitude ratio for the regions. Therefore, there is no need to perform loop gain adjustment for every region, so adjustment takes less time during start-up.

Also, with the optical disk device 200 of this embodiment, it is possible to determine a region from the change in the PPTE signal amplitude during the track search operation.

Furthermore, it is possible to set the optimal tracking control loop gain for each region by combining the estimation of loop gain with the determination of region, and switching the estimated loop gain according to the determination result.

Therefore, when this embodiment is employed, stable tracking control can be achieved for each region of an optical disk having a plurality of regions of different track pitch. Accordingly, an optical disk device with high reliability can be realized as a device for reproduction and recording of an optical disk.

At the same time, the performance of the optical disk device is improved because adjustment takes less time during start-up.

Track Jumping

With the optical disk device of this embodiment, the region is determined from the change in the PPTE signal amplitude during a track search operation. This involves detecting the track pitch of a region from the PPTE signal amplitude. This track pitch detection result can be utilized for a track search operation, which will be described below.

In a track search operation, an operation called track jumping is also performed in addition to the above-mentioned operation of moving the optical head 100 in the radial direction with the transport motor 130. This track jumping operation will be described through reference to FIG. 4.

Figure 4:
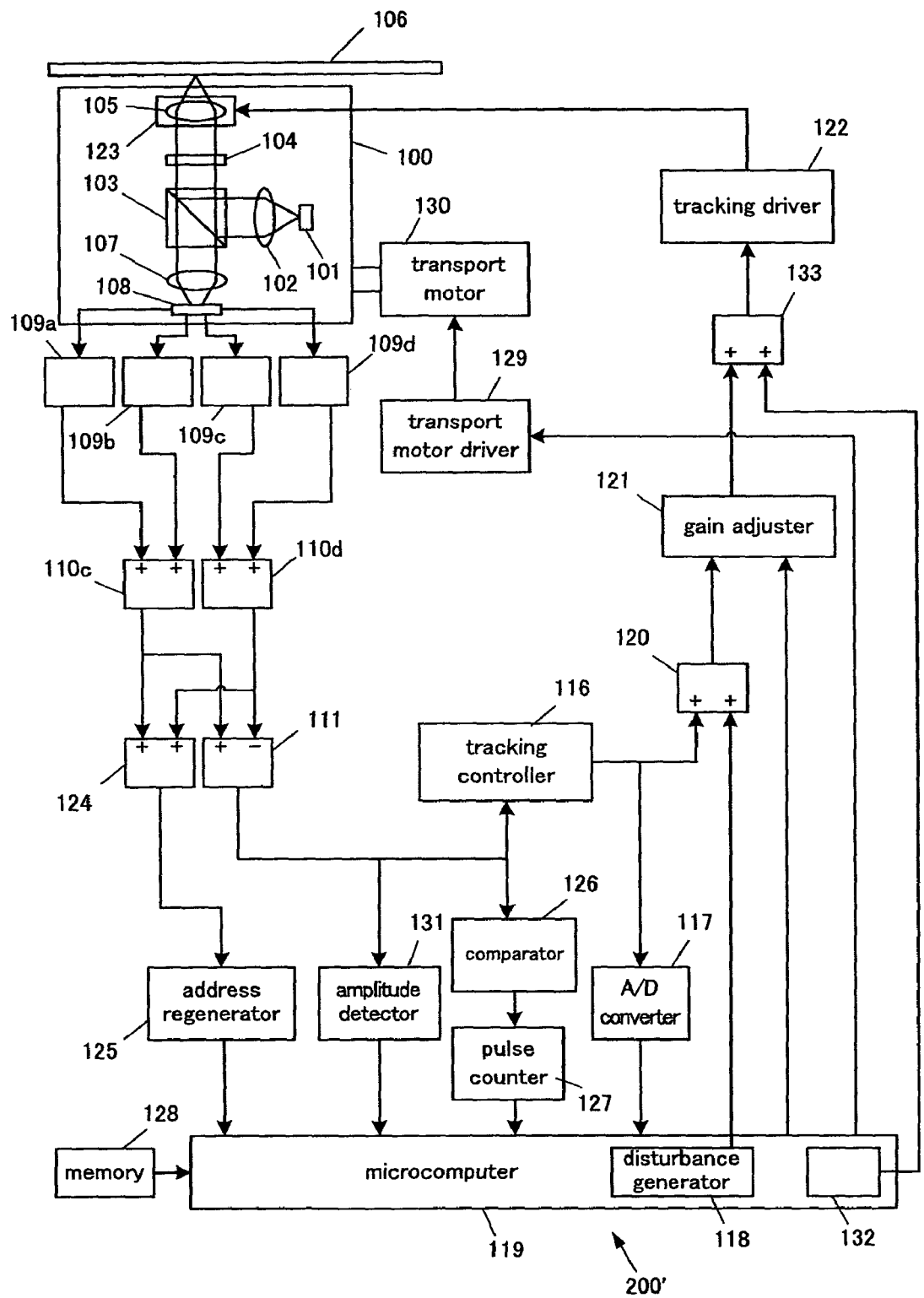
FIG. 4 is a block diagram of the configuration of an optical disk device that performs track jumping.
Figure 5A:
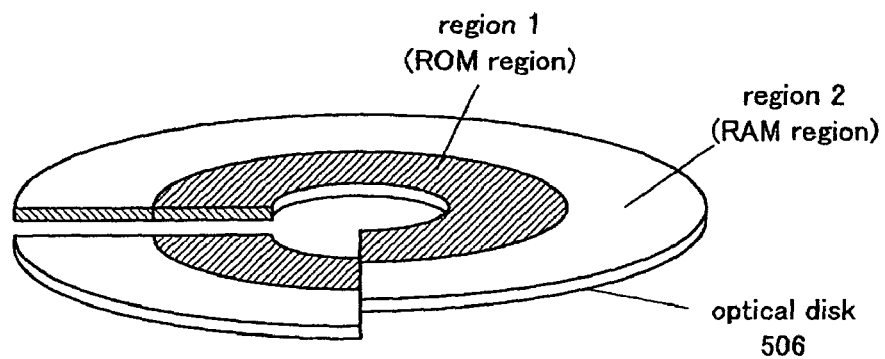
FIG. 5 is a schematic of the structure of a DVD-RAM.
Figure 5B:
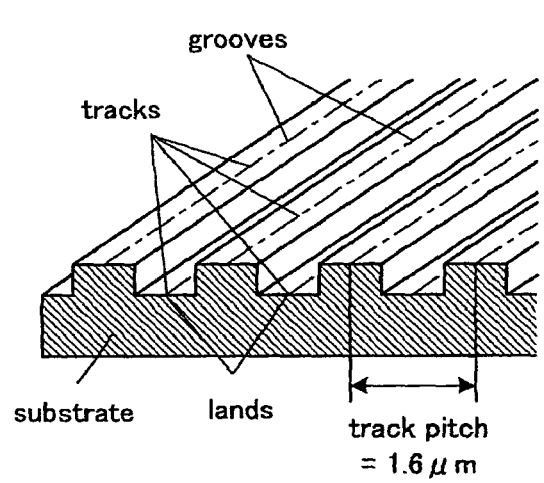
Figure 5C:
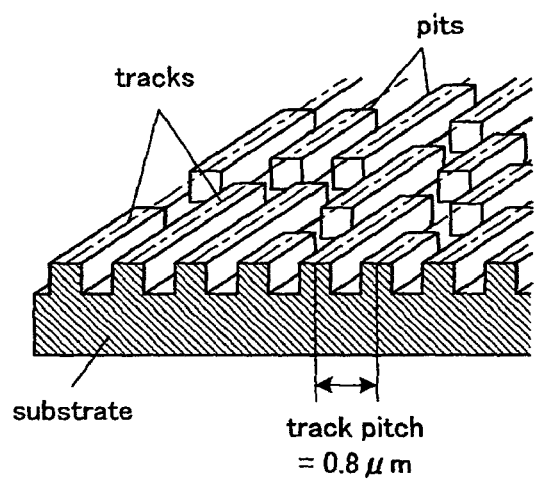
Figure 6:
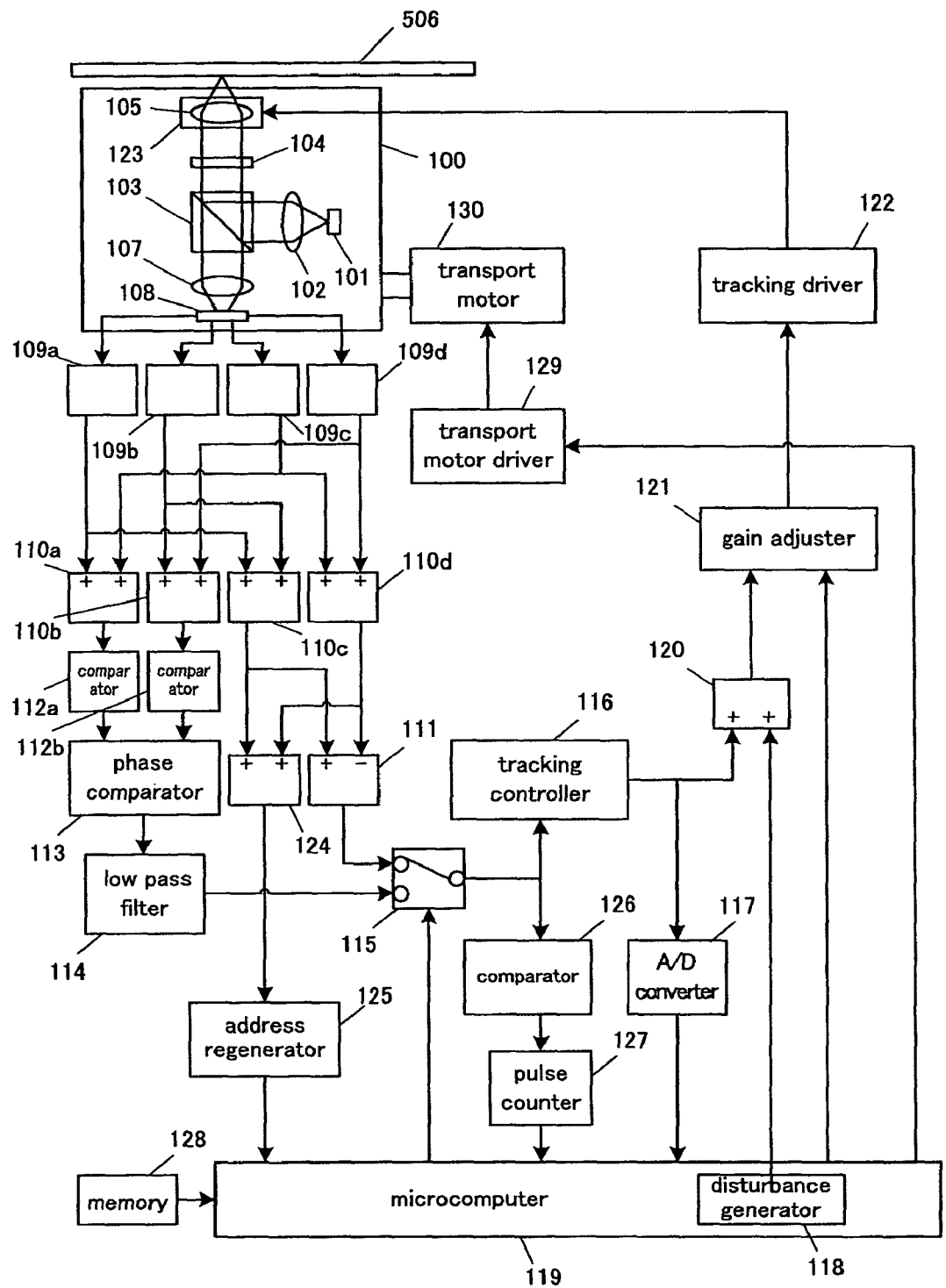
FIG. 6 is a block diagram of a prior art optical disk device.
Figure 7:
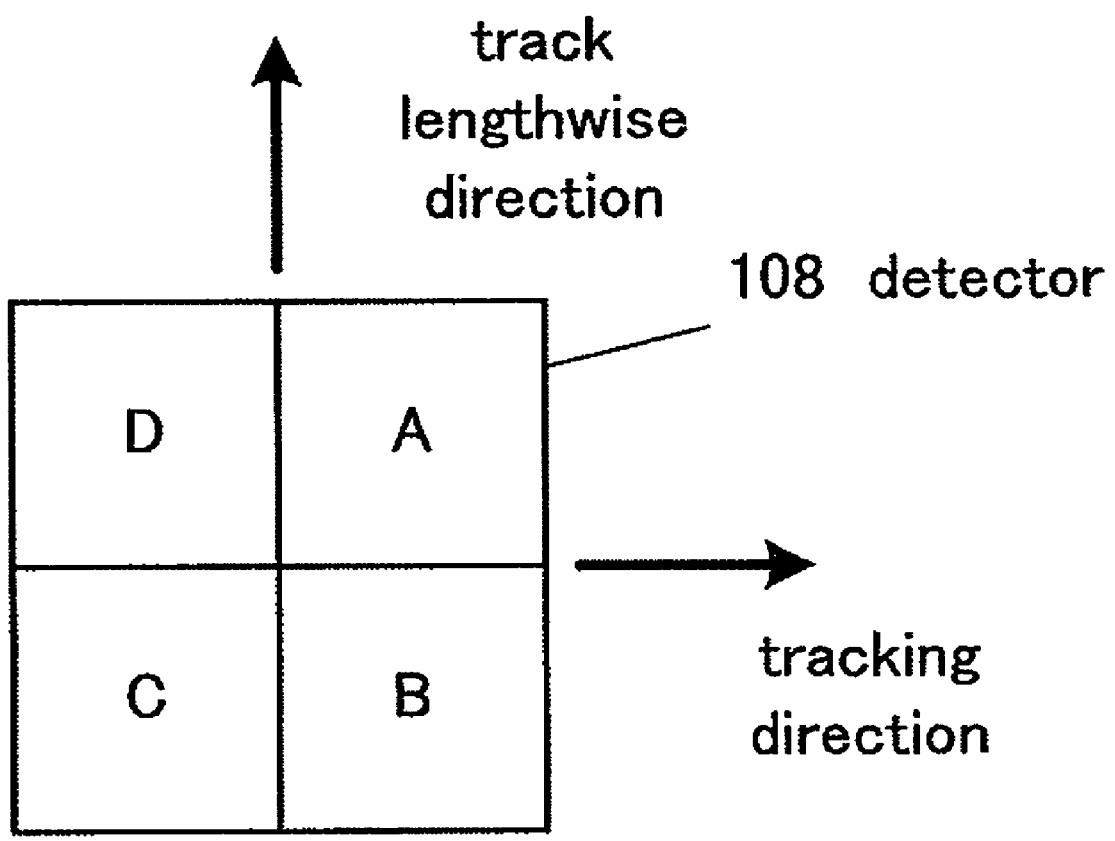
FIG. 7 is a plan view of the detection region of a detector 108 in a prior art optical disk device.

FIG. 4 is a block diagram of the configuration of an optical disk device 200' that performs track jumping. A jump pulse generator 132 outputs a pulsed drive signal (hereinafter referred to as track jump signal) to an adder 133 according to a command from the microcomputer 119. The adder 133 adds the output signal from the gain adjuster 121 and the track jump signal and outputs the result to the tracking driver 122. The output signal from the adder 133 is inputted to the tracking driver 122 and amplified, then outputted to the tracking actuator 123. As a result of the above, the objective lens 105 is moved by one track in the radial direction. This operation is called track jumping.

The optimal wave height of the pulsed track jump signal used in this track jumping operation is a function of track pitch. In view of this, with the optical disk device in this embodiment, the wave height of the track jump signal is increased or decreased according to the track pitch detected for each region. Specifically, the greater the track pitch detected in the track search operation, the greater the wave height of the outputted track jump signal. As a result, track jumping can be performed stably and precisely. This also affords a more stable and reliable track search operation.

Other Embodiments (1) The description in this embodiment assumed that the optical disk 106 had the same configuration as a BD (Blu-ray Disc). The present invention described in this embodiment, however, is not limited to a BD, and can also be applied to other optical disks.

(2) The effects of the present invention are particularly pronounced when the same method for detecting tracking error signals is used for a plurality of regions of different track pitch. For instance, with a DVD-RAM, a ROM region having pit strings is formed around the inner periphery, while a RAM region having a continuous groove is formed around the outer periphery. With a conventional method, a different method for detecting a tracking error signal was applied for each region, with a phase difference method being applied for the ROM region, and a push-pull method for the RAM region. Furthermore, with a conventional method, the track pitch is different in each region, with the track pitch in the ROM region being 0.8 µm, and the track pitch in the RAM region 1.6 µm.

With a DVD-RAM such as this, because the regions have different track pitches, and different methods for detecting a tracking error signal are used for the various regions, the suitable tracking loop gain is different from each region.

Consequently, with prior art, when the tracking loop gain is found for each region of a DVD-RAM, the tracking loop gain is usually adjusted for each region, and it is not customary to estimate the tracking loop gain of one region on the basis of the tracking loop gain adjusted in another region. On the contrary, the proper tracking loop gain cannot be estimated even if an estimation of the tracking loop gain is attempted using tracking error signals obtained by different tracking error signal detection methods.

Meanwhile, with a BD, for example, a RAM region having a continuous groove in which information is recorded by wobbling the shape of the tracks is formed around the inner periphery, while a RAM region having a continuous groove is formed around the outer periphery. The same tracking error signal detection method (push-pull method) is used for both regions. The track pitch in each region is different, with the track pitch in the inner RAM region being 0.35 µm, and the track pitch in the outer RAM region 0.32 µm.

As discussed above, with a BD, only the track pitch in each region is different, meaning that the suitable tracking loop gain for each region is also different.

In view of this, when the present invention is applied to a BD, the tracking loop gain can be estimated by using tracking error signals obtained by the same tracking error signal detection method, so the proper tracking loop gain can be estimated.

(3) The effects of the present invention are particularly pronounced when the invention is used for an optical disk that requires relatively high tracking control precision. For instance, the present invention is particularly effective when used for a BD. More specifically, since the track pitch is narrower with a BD, tracking control needs to be more precise than with a DVD-RAM (relatively speaking, a DVD-RAM does not require that much precision). For example, the permissible error in tracking control is 0.022 µm with a DVD-RAM, whereas the permissible error is only 0.009 µm with a BD.

To perform high-precision tracking control, the tracking loop gain must be set properly in each of the regions with different track pitches. In the past, with a DVD-RAM, for instance, tracking control did not require that much precision. Because of this, variance between optical disks or drives did not affect tracking control very much. Even when the tracking loop gain is found for regions of different track pitch, if the difference in the tracking loop gain between the various regions is determined ahead of time, and the tracking loop gain for these regions is estimated from the tracking loop gain of one region and the predetermined difference, it will be possible to achieve tracking control of the minimum required precision.

On the other hand, a BD, for example, requires high-precision tracking control. Accordingly, any variance between optical disks or drives greatly affects tracking control, so the tracking loop gain must be properly adjusted for each region.

In this case, the tracking loop gain may be adjusted for every single region, but this means that adjustment will take a long time, in addition to the problems discussed in (4) below.

In view of this, if the present invention is applied, so that the tracking loop gain is adjusted for one region, and the tracking loop gain is estimated for any other regions from the result of measuring the amplitude of tracking error signals, tracking control can be carried out at high precision, and the adjustment of the loop gain will not take as long.

(4) The effects of the present invention are particularly pronounced when applied to an optical disk that requires even higher tracking control precision. For instance, as discussed in (3) above, the tracking loop gain can be adjusted for every region in situations that require high-precision tracking control. In this case, if the tracking loop gain is adjusted in the RAM region around the outer periphery, the value of the adjusted tracking loop gain will be affected by whether or not information has been recorded in this RAM region. Accordingly, when high-precision tracking control is required, adjusting the tracking loop gain for every region is not suitable. In addition, adjusting the tracking loop gain for every region takes longer, so adjustment takes more time during start-up.

When the present invention is used, on the other hand, adjustment of the tracking loop gain is performed only in the RAM region around the inner periphery, where no information has been recorded. Furthermore, the value of the tracking loop gain in the RAM region around the outer periphery is estimated from the value of the adjusted tracking loop gain. Accordingly, in the present invention, adjustment takes less time, and adjusting the tracking loop gain for every region can be carried out.

(5) In this embodiment, the constituent elements that successively processed the output signals from the preamps 109a to 109d were all electrical circuits. Specifically, the above description was for the utilization of analog circuits. However, the effect will be the same if these constituent elements are digital circuits instead. Specifically, the output signals from the preamps 109a to 109d may be converted into digital signals by an A/D converter, and these digital signals may be successively processed by various constituent elements consisting of digital circuits.

(6) In this embodiment, the plurality of regions of different track pitch consisted of two regions (region 1 and region 2), but the number of regions is not limited to two.

(7) Also, in this embodiment, a method in which disturbance of a specific frequency was applied to the control system, the response waveform was sampled, calculations were performed, and adjustments were made so as to obtain a specific loop gain was employed as the loop gain adjustment means, but the loop gain adjustment means is not limited to this method.

(8) In the above embodiment, the various components shown in block diagrams may be formed by an integrated circuit configured integrally or separately. For instance, in FIGS. 1 and 4, the components other than the optical disk 106, the optical head 100, and the transport motor 130 can be formed by integrated circuits. Also, the functions of components that can be formed by integrated circuits may be executed by programs on a computer or the like.

The optical disk device of the present invention allows stable tracking control in all regions of an optical disk having a plurality of regions of different track pitch, and is useful as a method for increasing the reliability of devices that reproduce and record from and to an optical disk.

Further, a disk format is conceivable in which the track pitch of a specific region on the inner periphery is widened to stabilize a servo, and system information or disk information is entered ahead of time in this region, and the present invention is useful with such disks as well.

Also, the optical disk device of the present invention shortens the time adjustment takes during start-up, and is useful as a method for improving the performance of devices that reproduce and record from and to an optical disk.

This application claims priority to Japanese Patent Application No. 2004-126592. The entire disclosure of Japanese Patent Application No. 2004-126592 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An optical disk device for recording information in a first region and a second region of an information carrier having two or more regions of different track pitch, or for reproducing information that has been recorded, the first region being formed with a track pitch different from a track pitch of the second region, said optical disk device comprising:
   a focusing unit operable to focus an optical beam and direct the optical beam at the information carrier;
   a movement unit operable to move the focal point of the optical beam focused by the focusing unit in a radial direction of the information carrier;
   a light receiving unit operable to receive the optical beam reflected by an information side of the information carrier;
   a track offset detection unit operable to detect offset between the track and the focal point of the optical beam on the basis of a signal from the light receiving unit;
   a tracking control unit operable to drive the movement unit on the basis of a signal from the track offset detection unit, and to control the focal point of the optical beam so as to scan the track;
   a loop gain adjustment unit operable to adjust a first loop gain used in tracking control of the first region, which is the loop gain of the tracking control unit; and
   a loop gain estimation unit operable to estimate a second loop gain used in tracking control of the second region, wherein the loop gain estimation unit
   (i) detects, from the signal from the track offset detection unit, a first amplitude that is an amplitude of the signal from the first region and a second amplitude that is an amplitude of the signal from the second region, and
   (ii) estimates the second loop gain of the second region on the basis of the first loop gain of the first region determined by the loop gain adjustment unit and a ratio between the first amplitude and the second amplitude.

2. An optical disk device for recording information in a first region and a second region of an information carrier having two or more regions of different track pitch, or for reproducing information that has been recorded, the first region being formed with a track pitch different from a track pitch of the second region, said optical disk device comprising:
   a focusing unit operable to focus an optical beam and direct the optical beam at the information carrier;

a movement unit operable to move the focal point of the optical beam focused by the focusing unit in a radial direction of the information carrier;

a light receiving unit operable to receive the optical beam reflected by an information side of the information carrier;

a track offset detection unit operable to detect offset between the track and the focal point of the optical beam on the basis of a signal from the light receiving unit;

a tracking control unit operable to drive the movement unit on the basis of a signal from the track offset detection unit, and to control the focal point of the optical beam so as to scan the track;

a loop gain adjustment unit operable to adjust a first loop gain used in tracking control of the first region, which is the loop gain of the tracking control unit; and a loop gain estimation unit operable to estimate a second loop gain used in tracking control of the second region, wherein the loop gain estimation unit comprises a storage unit operable to store a ratio between the track pitch in the first region and the track pitch in the second region as a predetermined value, and wherein the loop gain estimation unit estimates the second loop gain of the second region on the basis of the first loop gain of the first region and the predetermined value stored in the storage unit.

3. The optical disk device according to claim 1, further comprising a region determination unit operable to determine whether the focal point of the optical beam is located in the first region or the second region, wherein the loop gain of the tracking control unit is switched according to the determination result of the region determination unit.

4. The optical disk device according to claim 3, wherein the region determination unit determines the region in which the focal point of the optical beam is located from a change from the first amplitude to the second amplitude or a change from the second amplitude to the first amplitude.

5. The optical disk device according to claim 3, further comprising a track search unit operable to move the focal point of the optical beam to a desired track, wherein the region determination unit determines the region in which the focal point of the optical beam is located when the focal point of the optical beam is moved across the track by the track search unit.

6. The optical disk device according to claim 1, wherein the first region on the information carrier is a region in which predetermined information has been recorded using a change in the shape of the track, and the predetermined information is reproduced before the focal point of the optical beam moves to the second region.

7. The optical disk device according to claim 1, wherein the second region on the information carrier is a region in which the recording or reproduction of information is performed.

8. A loop gain setting method, for setting the loop gain used in the tracking control of regions in an optical disk device that records information to a first region and a second region of an information carrier having two or more regions, or reproduces recorded information, the first region being formed with a track pitch different from a track pitch of the second region, the loop gain setting method comprising the steps of:

adjusting a first loop gain used in tracking control of the first region; and estimating a second loop gain used in tracking control of the second region, wherein said estimating the second loop gain comprises the steps of:

detecting a first amplitude that is an amplitude of a signal obtained from the first region and a second amplitude that is an amplitude of a signal obtained from the second region; and estimating the second loop gain of the second region on the basis of the first loop gain of the first region determined in said adjusting the first loop gain and a ratio between the first amplitude and the second amplitude.

9. A computer readable medium storing a loop gain setting program, for executing on a computer a loop gain setting method for setting the loop gain used in the tracking control of regions in an optical disk device that records information to a first region and a second region of an information carrier having two or more regions, or reproduces recorded information, the first region being formed with a track pitch different from a track pitch of the second region, the loop gain setting method comprising the steps of:

adjusting a first loop gain used in tracking control of the first region; and estimating a second loop gain used in tracking control of the second region, wherein said estimating the second loop gain comprises the steps of:

detecting a first amplitude that is an amplitude of a signal obtained from the first region and a second amplitude that is an amplitude of a signal obtained from the second region; and estimating the second loop gain of the second region on the basis of the first loop gain of the first region determined in said adjusting the first loop gain and a ratio between the first amplitude and the second amplitude.

* * * * *